Jan. 19, 1965  G. SAMUELS  3,166,103
GRID MANUFACTURING APPARATUS
Filed July 20, 1961  9 Sheets-Sheet 1

INVENTOR.
Gerard Samuels
BY
William A. Zalesak
Attorney

INVENTOR.
Gerard Samuels

Jan. 19, 1965     G. SAMUELS     3,166,103
GRID MANUFACTURING APPARATUS
Filed July 20, 1961     9 Sheets-Sheet 3

INVENTOR.
Gerard Samuels
BY
William A. Zalesak
Attorney

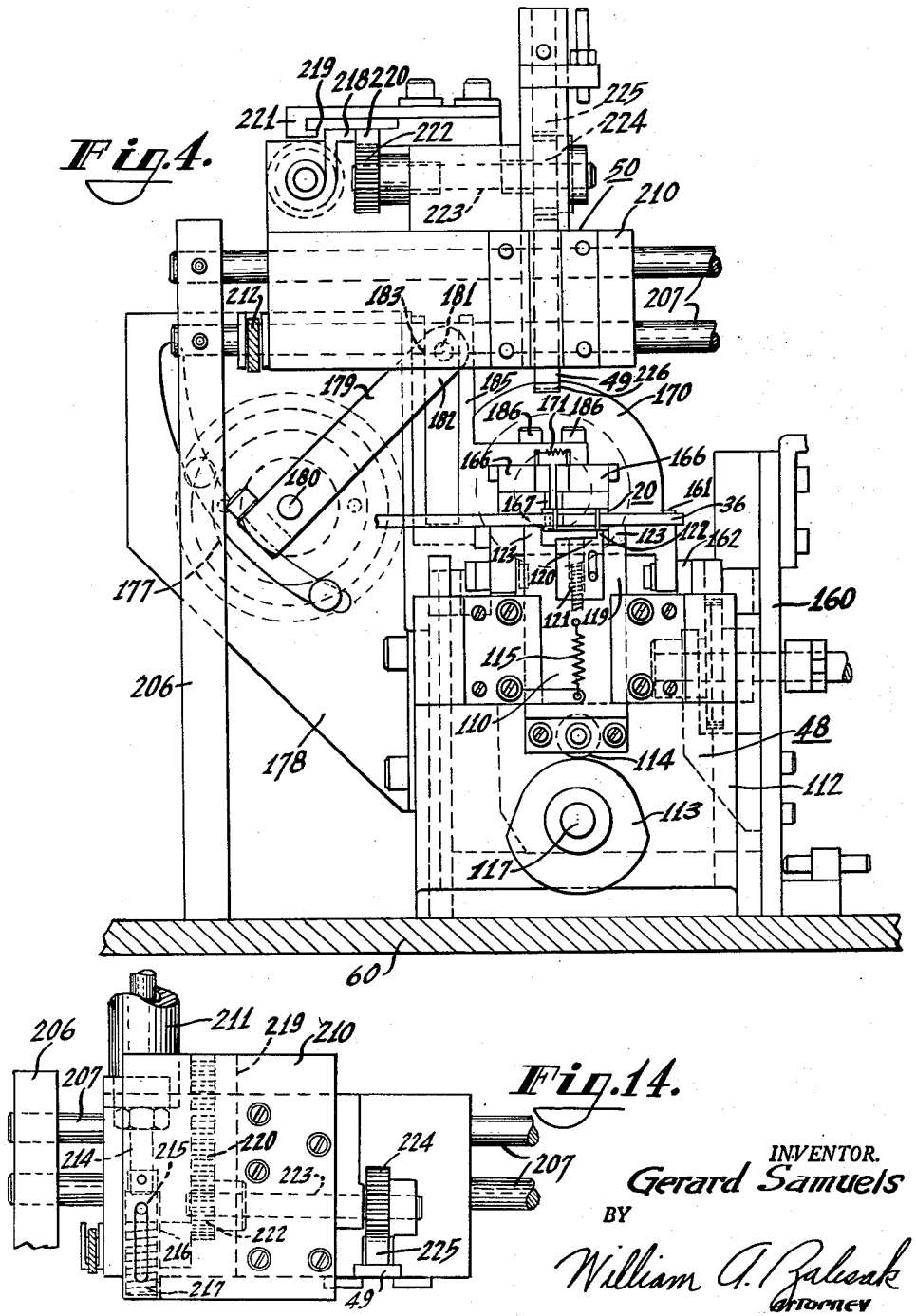

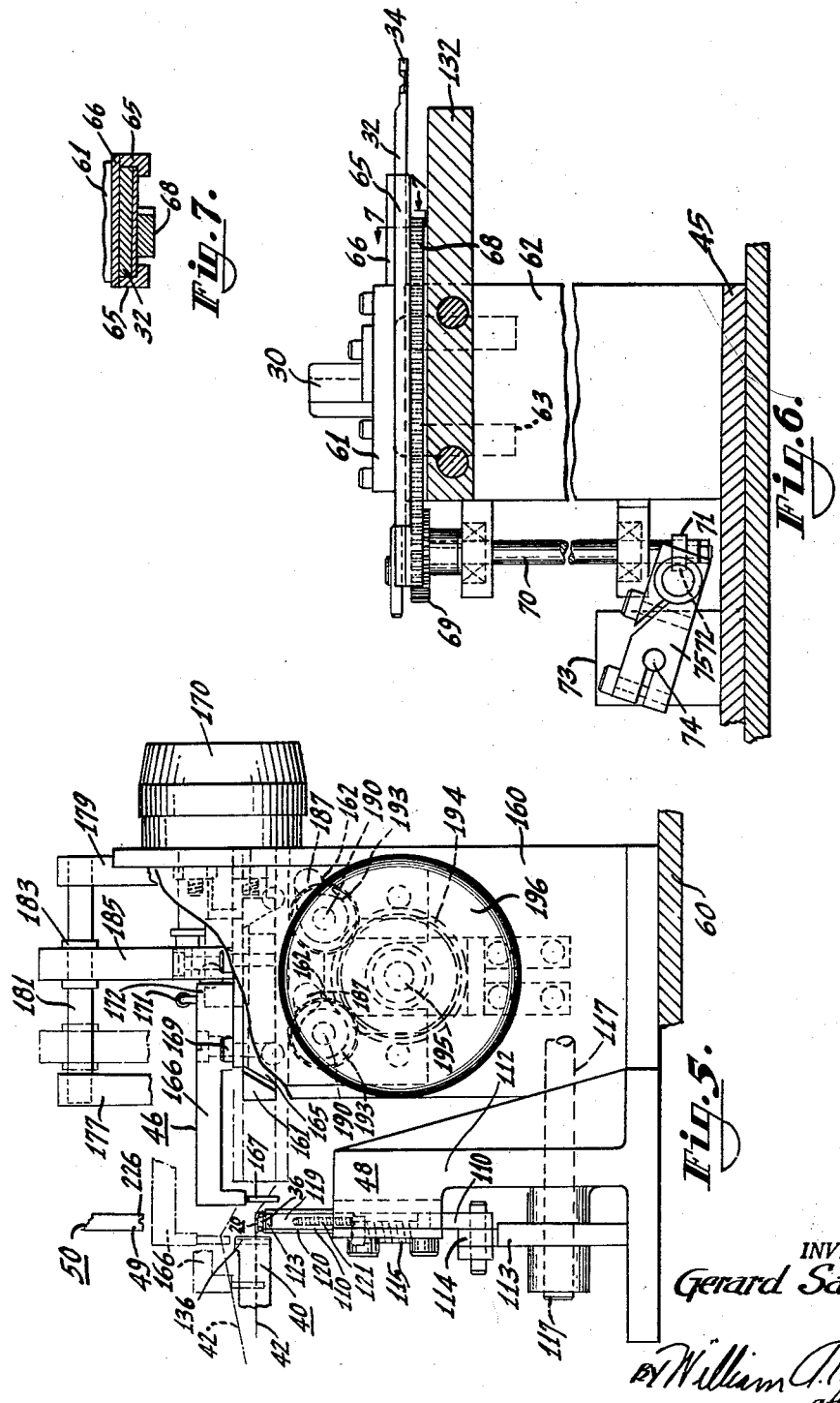

INVENTOR.
Gerard Samuels
BY
William A. Zaluck
ATTORNEY

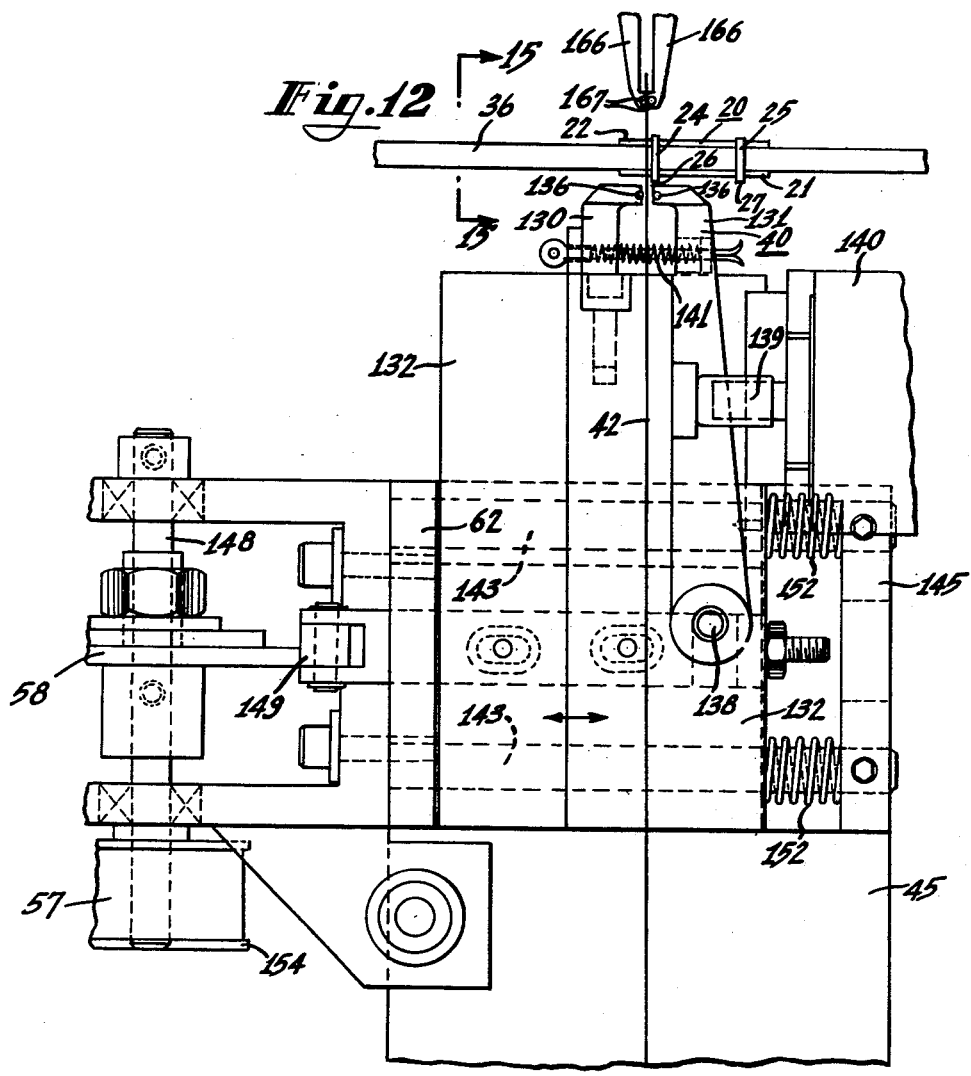

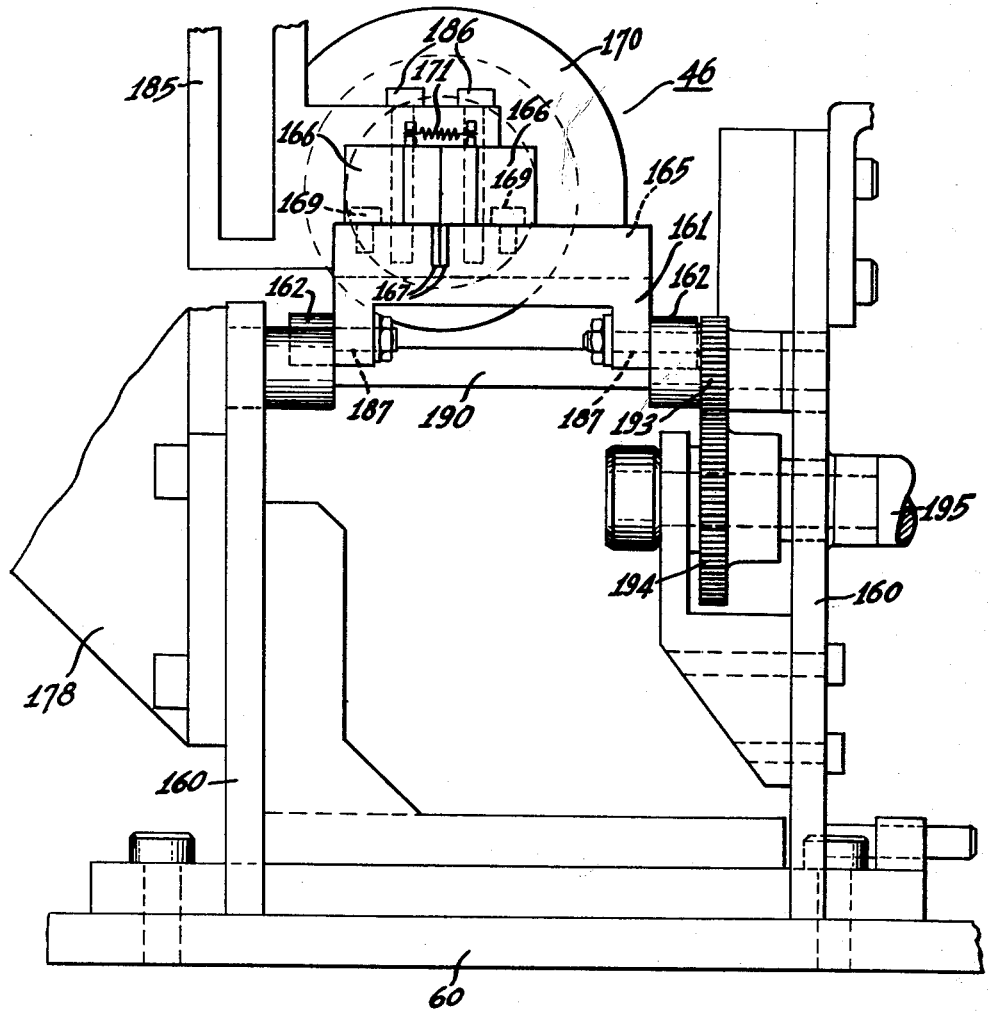

Jan. 19, 1965    G. SAMUELS    3,166,103
GRID MANUFACTURING APPARATUS
Filed July 20, 1961    9 Sheets-Sheet 9
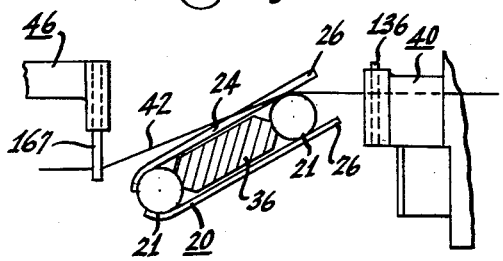
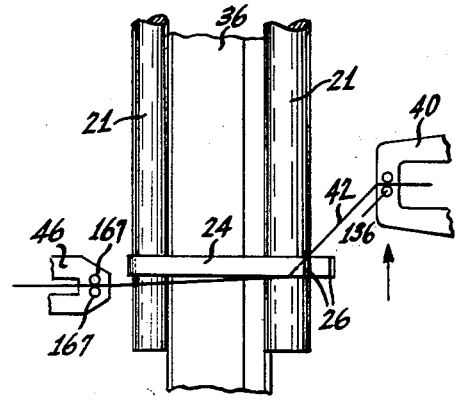
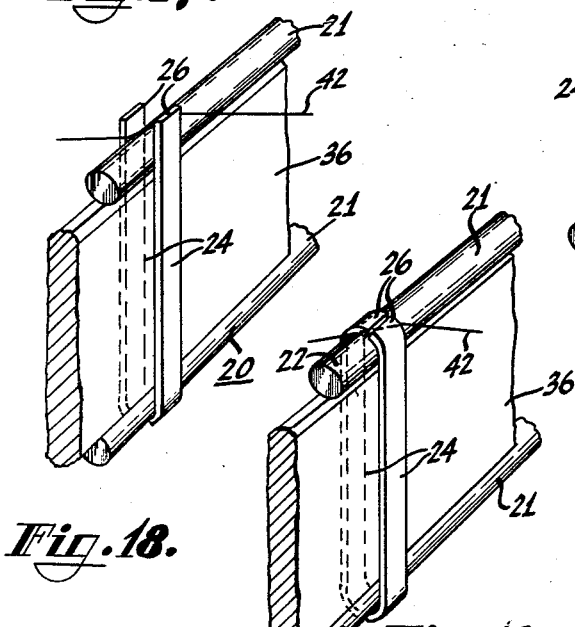
INVENTOR.
Gerard Samuels
BY
William A. Zalesak
Attorney

United States Patent Office 3,166,103
Patented Jan. 19, 1965

3,166,103
GRID MANUFACTURING APPARATUS
Gerard Samuels, Teaneck, N.J., assignor to Radio Corporation of America, a corporation of Delaware
Filed July 20, 1961, Ser. No. 125,567
21 Claims. (Cl. 140—71.5)

This invention relates to a new and advantageous apparatus for fabricating grid electrodes of the type known as frame grids.

In the manufacture of certain types of electron tubes, it is necessary to provide therein grid electrodes having a large number of closely and uniformly spaced lateral wires of very small diameter. Appropriate use of such grids results in electron tubes having such desired characteristics as high transconductance and relatively distortionless electrical signal reproduction. In order to support the small diameter lateral wire turns, a self-supporting grid frame comprising a pair of side rods spaced apart by cross straps is provided, the grid lateral wire being wound about and between the two side rods in a continuous helix.

Heretofore, grid laterals have been secured to their support frames in many ways, the more common of which include a fused metal joint produced by brazing, a cemented joint, or a mechanically secured joint obtained through the practice of notching the support frame, laying the lateral wire in the notch, and swaging the walls of the notch closed over the lateral wire. A frequent practice has been to secure each lateral wire turn of the helix to the grid support frame. In many instances, however, where the lateral wire is very small and fragile, only the end turns of a continuous helical winding wound about the frame are secured thereto.

As well known, each of these methods has at least one problem associated with it. Brazing, for example, causes distortion of the grid due to the high brazing temperatures involved. Cementing requires expensive masking techniques to insure that the cement is applied to only certain desired portions of the grids so as not to interfere with the electrical operation of the electron tube. Notching and swaging causes distortion of the grid frames due to the pressures of the notching and swaging tools.

In an attempt to avoid the problems incident to the aforementioned lateral wire securing methods, a new method for securing a lateral wire to the grid frame has been suggested. This method comprises positioning a portion of the lateral wire between an ear projecting from the grid frame and a body portion of the frame and crimping the ear against the body portion for clamping and securing the lateral wire therebetween. Advantages of this method are that no heat or notching need be employed, thereby avoiding distortion of the grid. In addition, the cost of the grid is reduced due to the simplicity and small number of grid fabricating operations that need be performed.

It is an object of this invention to provide apparatus for fabricating frame grid electrodes.

Particularly, it is an object of this invention to provide apparatus for winding a lateral wire on a grid frame and for securing the lateral wire to the grid frame by the crimping method described.

For achieving these objects in accordance with this invention, an apparatus is provided which includes a mandrel adapted to receive thereon a grid frame to be wound. A lateral wire grasping means is provided for grasping a lateral wire extending from a supply spool and for pulling it across and against the grid frame. A threading device is provided for threading the lateral wire between an extending ear and a body portion of the grid frame. A crimping device adjacent the mandrel crimps the ear against the body portion to clamp the lateral wire therebetween. After the lateral wire is secured to the grid frame, means are provided for rotating the mandrel to wind the lateral wire on the frame in a plurality of spaced apart turns.

FIG. 4 is a section taken along the line 4—4 of FIG. 2;

FIG. 5 is a section taken along the line 5—5 of FIG. 3;

FIG. 6 is a section taken along the line 6—6 of FIG. 3 but at a later step in the grid fabricating cycle and showing the grid frame positioning and mandrel loading mechanisms;

FIG. 7 is a sectional view along line 7—7 of FIG. 6;

FIG. 12 is a fragmentary plan view on an enlarged scale of details of the apparatus shown in FIG. 3 including details of the wire feed mechanisms;

FIG. 13 is a partial elevation on an enlarged scale of details of the mechanism of FIG. 4 including the mechanism for grasping the lateral wire;

FIG. 14 is a fragmentary plan view showing details of the structure shown in FIG. 4 and particularly the grid frame ear crimping mechanism;

FIG. 15 is an enlarged sectional view along line 15—15 of FIG. 12 but at a later step in the fabrication cycle;

FIG. 16 is a view similar to FIG. 15 but at a later step in the grid fabricating cycle;

FIG. 17 is a plan view of the same portion of the apparatus as shown in FIGS. 15 and 16, but at a still later step in the grid fabricating cycle;

FIG. 18 is a view in perspective of portions of the mandrel and the grid frame showing the lateral wire threaded between the grid frame ears;

FIG. 19 is a view similar to FIG. 18 but showing the lateral wire clamped to the grid frame; and FIG. 20 is a view in perspective of a frame grid assembly made by the apparatus of this invention.

Figure 1:
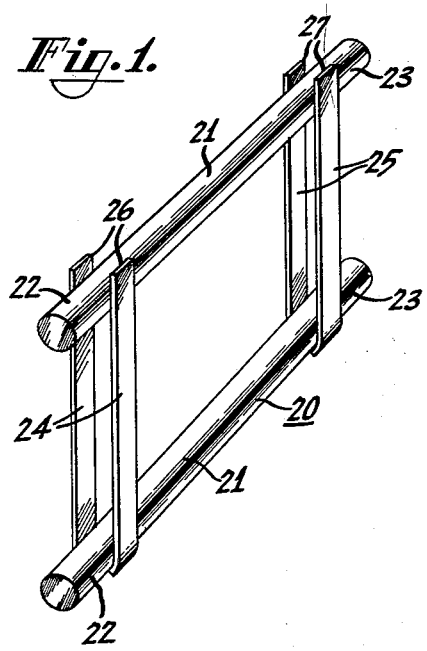
FIG. 1 is a view in perspective of a grid frame of the type used for making a grid electrode by apparatus made according to this invention.

FIG. 1 shows a grid frame 20 of the type which may be fabricated into a grid electrode by the apparatus of this invention. The frame 20 comprises a pair of parallel cylindrical side rods or supports 21 having end lengths or legs 22 and 23. Two pairs of parallel cross straps 24 and 25 extend between the side rods 21 adjacent each end thereof and are joined to the side rods as by welding. The cross straps 24 and 25 have ends or ears 26 and 27, respectively, which extend beyond one of the side rods 21. Since ears 26 and 27 are crimped against the side rod 21 for clamping the lateral wire therebetween as will be described, the cross straps are made of a relatively non-resilient, soft material, such as annealed molybdenum.

Figure 2:
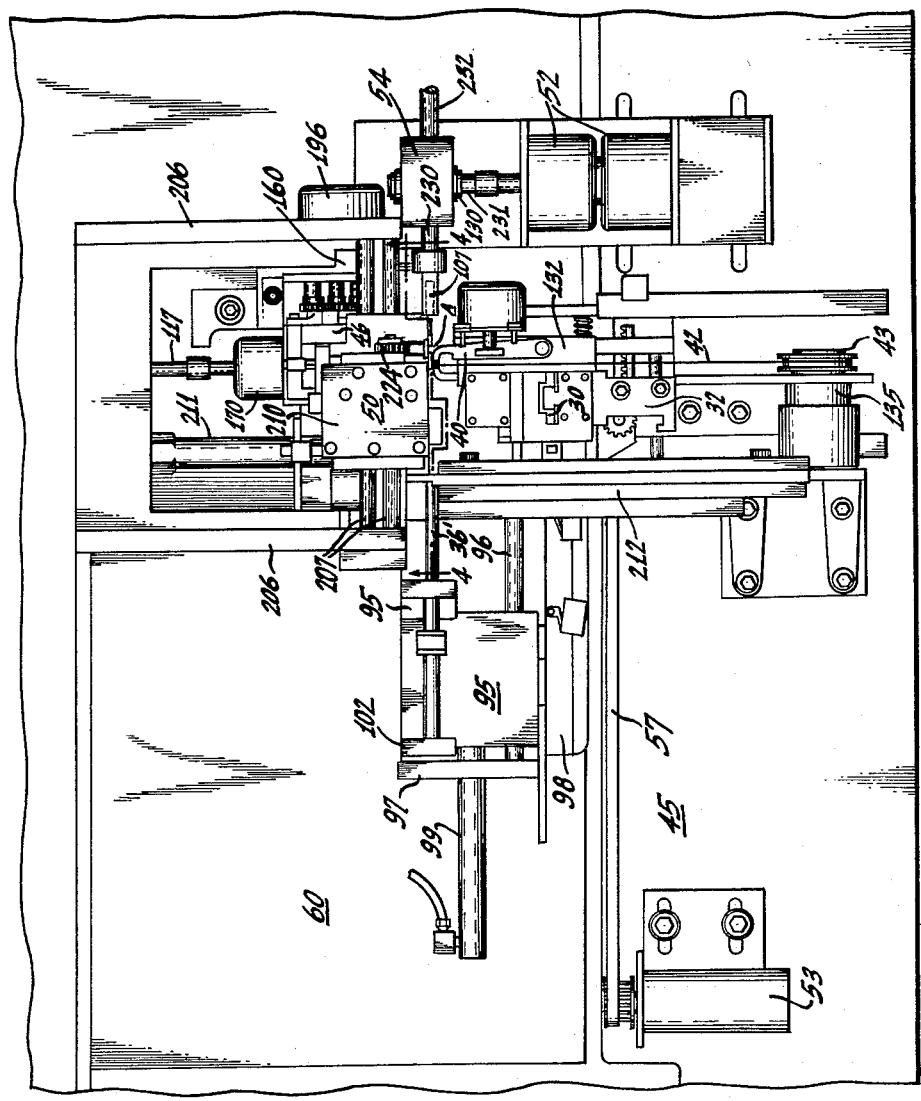
FIG. 2 is a plan view of apparatus using this invention.
Figure 3:
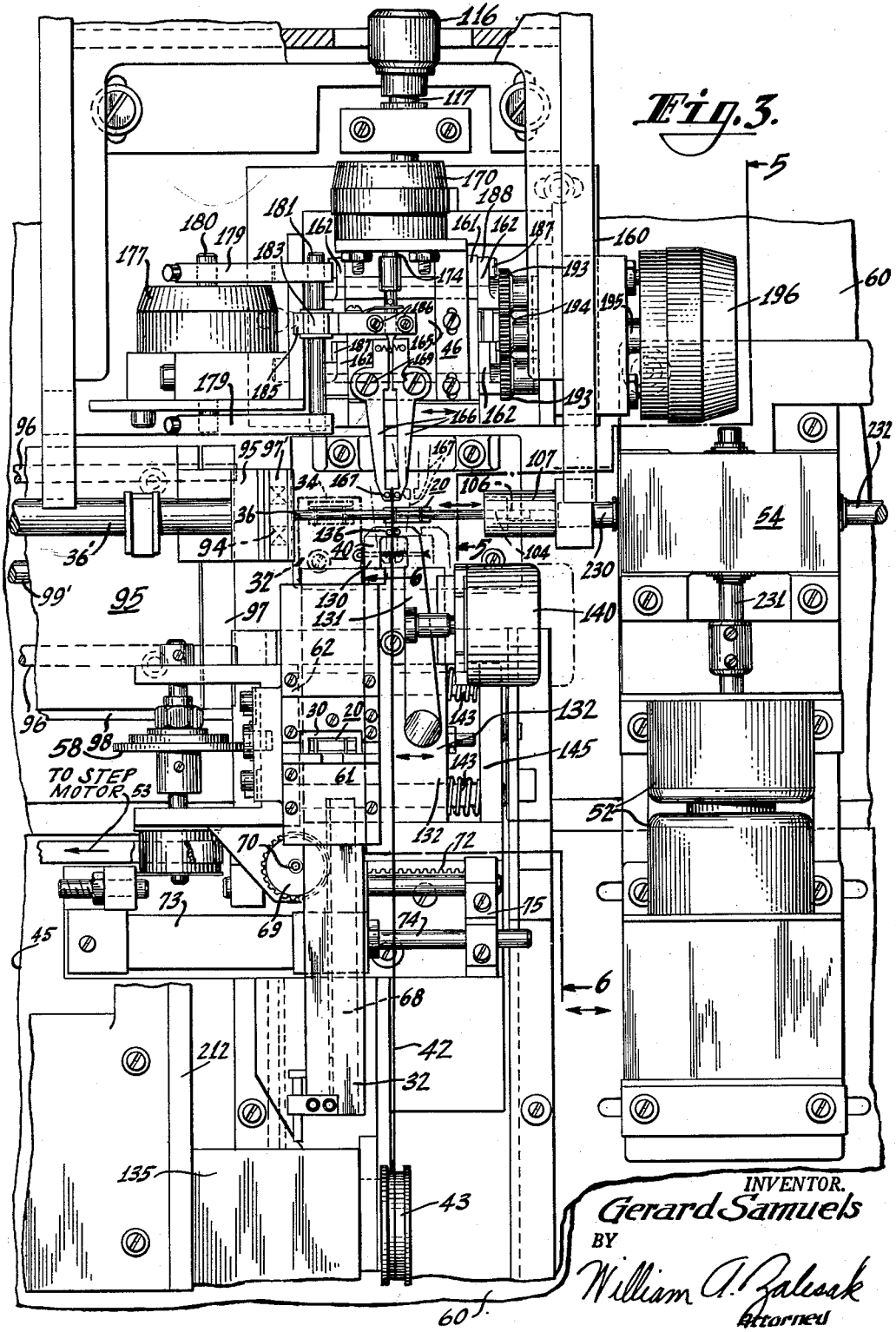
FIG. 3 is a partial plan view of the apparatus shown in FIG. 2 but at a later step in the grid fabricating cycle, with parts removed to show details of construction.

Referring to FIGS. 2 and 3, the apparatus of this invention includes, generally, a mandrel 36 for engaging and supporting thereon a grid frame 20 to be wound. A mechanism for feeding the frame grids to the mandrel 36 includes a grid frame receiving magazine 30 for storing a number of grid frames 20 and a slide 32 having a tray 34 (shown in phantom in FIG. 3) mounted on one end thereof for receiving the grid frames one by one from the magazine 30. Also provided is a wire guide 40 for guiding a lateral wire 42 from a supply spool 43 onto a grid frame 20 mounted on mandrel 36. A lateral wire grasping mechanism 46 (shown partially covered in FIG. 2 and fully visible in FIG. 3) is provided for grasping the lateral wire 42 at the wire guide 40 and for pulling it transversely across the mandrel 36 and against the grid frame 20. An anvil mechanism 48 is also provided, which, however, is not visible in FIGS. 2 and 3, the location of the anvil mechanism being indicated in FIG. 2 by the letter A. The anvil mechanism 48 is shown in FIGS. 4 and 5. The anvil mechanism 48 performs the dual functions of positioning a grid frame 20 along the mandrel 36 in proper relation with respect to the wire guide 40 and the lateral wire grasping mechanism 46, and providing support to mandrel 36 during crimping of the grid frame ears 26 and 27. Crimping of ears 26 and 27 is performed by a tool 49 of an ear crimping mechanism 50. The crimping mechanism 50 (FIGS. 2 and 4) is mounted for movement for positioning tool 49 first over ears 26 for crimping these ears prior to winding of the lateral wire, and then over ears 27 for crimping after winding.

For threading the lateral wire 42 between the ears 26 and between ears 27, and for winding the lateral wire about the grid frame 20, as will be described, mandrel 36 is rotatable either intermittently through small angular increments or continuously, and wire guide 40 is movable laterally with respect to mandrel 36 in a continuous motion or in a step-like indexing motion. For providing the angular incremental motion to mandrel 36, a step motor 52 (FIGS. 2 and 3) is provided which is coupled to mandrel 36 through a gear box 54. For providing the step-like movement to wire guide 40, the wire guide is mounted on a slide 132 which is indexable to the right or left as viewed in FIGS. 2 and 3 by means of a cam 58 (FIG. 3) driven by a step motor 53 (FIG. 2). Means are also provided for rotating mandrel 36 continuously and for feeding wire guide 40 continuously, but these means are neither shown nor described since a variety of suitable means for these purposes may be provided from known mechanisms.

Slide 32 and tray 34, wire guide 40, supply spool 43, slide 132, and step motor 53 will hereinafter be collectively referred to as the wire feeding mechanisms. The wire feeding mechanisms, along with magazine 30, are mounted on a table 45. The remaining apparatus parts referred to are mounted on a base plate 60. Base plate 60 and table 45, in turn, are mounted on the apparatus framework.

*Mandrel loading means*

For storing a number of grid frames 20 and feeding them to mandrel 36 in preparation for grid fabrication, a frame magazine 30 (FIGS. 3 and 6) and slide 32 are provided. Magazine 30 is open ended and is mounted on a plate 61 secured to a support block 62 by means of bracket 63. Support block 62 is secured to table 45, table 45, in turn, being slidably mounted on the machine framework for movement parallel to the mandrel 36. Within magazine 30, the grid frames 20 are stacked one on top of the other, the side rods 21 of the grid frames lying in horizontal planes and the ears 26 and 27 extending in the direction of the supply spool 43 (FIG. 3).

Closing the lower open end of magazine 30 and slidably mounted thereunder is the slide 32, the slide being provided with a tray 34 at one end thereof. As shown in FIGS. 6 and 7, slide 32 is slidably mounted within a housing formed by slide gibs 65 and top plate 66. Means for moving slide 32 within its housing comprise a rack 68 fastened to the underside of slide 32, a gear 69 meshed with rack 68 and secured to one end of shaft 70, a gear 71 secured to the other end of shaft 70 and meshed with a rack 72, and an air cylinder 73, the plunger 74 thereof being secured to rack 72 by means of clamp 75. Upon actuation of air cylinder 73, slide 32 may be moved within its housing for first positioning tray 34 under the open bottom end of the magazine 30 for receipt of a grid frame 20, and then positioning the loaded tray 34 in the path of mandrel 36, as indicated in phantom in FIG. 3.

Figure 8:
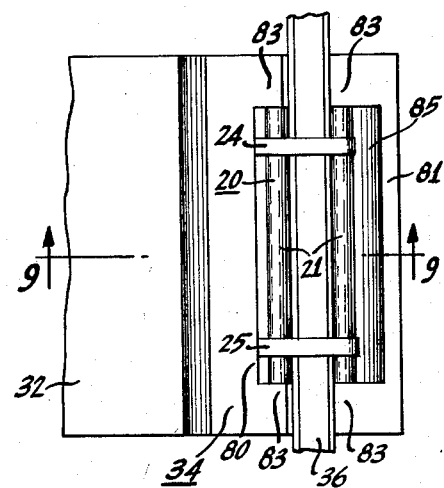
FIG. 8 is a plan view at an enlarged scale of a detail of the structure shown in FIG. 6.
Figure 9:
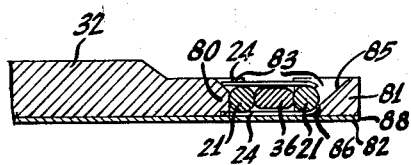
FIG. 9 is a section taken along line 9—9 of FIG. 8.
Figure 10:
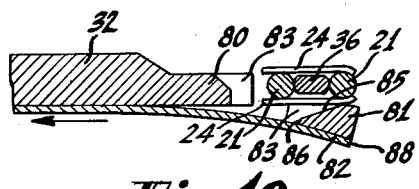
FIG. 10 is a view similar to FIG. 9 but showing a later step in the grid fabricating cycle.

As shown in FIGS. 8, 9 and 10, tray 34 is substantially open-ended and comprises two side walls 80 and 81 for receiving and positioning the side rods 21 of the grid frame 20, and a bottom support 82. Side walls 80 and 81 each have end stops 83 for preventing axial movement of the grid frame within the tray, and side wall 81 has an inner surface 85 which tapers downwardly towards side wall 80. Inner surface 85 is also provided with a shoulder 86 having a height slightly less than one-half the diameter of a grid frame side rod 21.

The end of slide 32 serves as side wall 80, side wall 81 is secured to the end 88 of bottom support 82, and bottom support 82 is secured to the underside of slide 32 at some distance inwardly of the end thereof. Bottom support 82 is made of a resilient material, such as steel, and is not secured to side wall 80. By means of this arrangement, it is possible to flex bottom support 82 downwardly as shown in FIG. 10. The purpose of the tray 34 and the reasons for its novel construction in accordance with one feature of this invention will be described hereinafter.

*Mandrel*

The purpose of mandrel 36 is to supportingly engage and remove a grid frame 20 from within tray 34, convey it to a position adjacent the wire guide 40 of the lateral wire feed mechanisms and support and rotate the grid frame during the lateral wire grid frame securing and winding operations.

Figure 11:
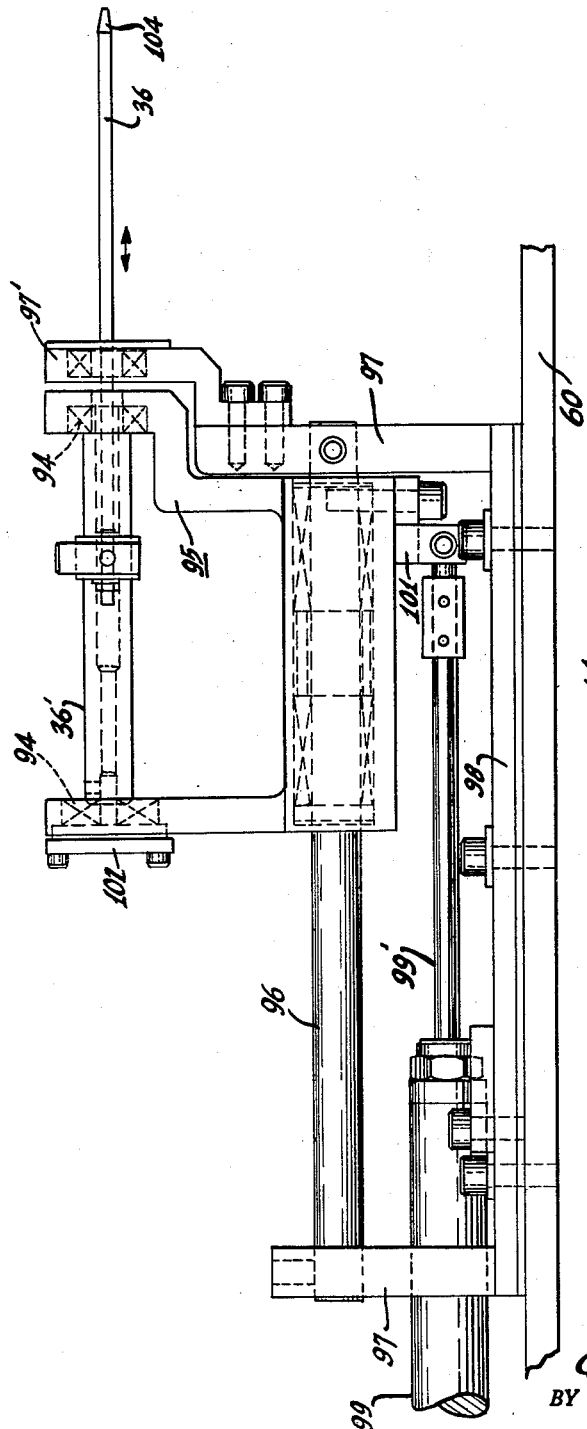
FIG. 11 is a side elevation of a detail of the apparatus shown in FIG. 2 but at a later step and showing the mandrel carriage.

Referring to FIGS. 2, 3 and 11, mandrel 36 is rotatably mounted within bearings 94 on a carriage 95, the carriage being slidably mounted on guide rods 96 secured by blocks 97 fastened in turn to plate 98. Plate 98 is secured to base plate 60. Movement of carriage 95 and hence movement of mandrel 36 to the right or left in these Figs. is provided by means of an air cylinder 99 mounted on plate 98, the plunger 99' of air cylinder 99 being coupled to carriage 95 by clamp 101. Although mandrel 36 is mounted for rotation within carriage 95, for reasons to be described, it is possible to lock mandrel 36 in fixed angular orientation. To accomplish this, a magnetic brake 102 of any suitable type known in the art is provided. Upon receipt of a first electrical signal, the magnetic brake 102 locks mandrel 36 in any angular orientation the mandrel happens to be in, and upon receipt of a second electrical signal, the brake release mandrel 36 for rotation. Further signals repeat the cycle.

As shown in FIGS. 9 and 10, mandrel 36 is generally rectangular in cross-section, and has a thickness which is slightly less than the diameter of the side rods 21 of the grid frame. Because of this, the distance between the planes formed by the lateral wire turns on each side of the wound grid electrode is determined entirely by the diameter of the side rods. Thus, since the lateral wires do not contact the mandrel, the lateral wires are not "dragged" or distorted upon removal of the wound grid from the mandrel. The width of the mandrel is such that the grid frames are supported on the mandrel in snug, slidable fit.

As mentioned, a grid frame 20 is loaded from magazine 30 into tray 34, and slide 32 then moved to position the tray 34 into the path of mandrel 36. Upon forward movement of mandrel 36, the leading end 104 of the mandrel passes through the open ends of tray 34 and through the openings in the grid frame 20 defined by cross strap pairs 24 and 25 and side rods 21 (FIGS. 8–10). End stops 83 of tray 34 prevent forward movement of the grid frame 20, however, and in order that mandrel 36 may convey the frame forward towards the wire guide 40, it is first necessary to move the tray out of the path of the frame.

To accomplish this, air cylinder 73 (FIG. 3) is actuated to retract slide 32 and tray 34 back under magazine 30. Since the grid frame is firmly mounted on the mandrel, a force parallel to the longitudinal axis of slide 32 is exerted by the fixed grid frame against the inner surface 85 of the side wall 81. The effect of this force is to bend the flexible bottom support 82 downwardly thereby permitting passage of side wall 81 underneath and past the grid frame (FIG. 10). The small shoulder 86 of inner surface provides proper positioning of grid frame 20 within tray 34 and the short height of the shoulder and the taper of the inner surface 85 prevent jamming of the grid frame side rod 21 against side wall 81 upon retraction of slide 32.

After removal of tray 34, the grid frame 20 is free to advance with mandrel 36, the mandrel continuing its advance until the leading end 104 thereof enters a rectangular aperture 106 in the mandrel rotating lathe head 107 (FIG. 3).

Wire feed mechanisms

The purposes of the wire feed mechanisms (see FIGS. 2, 3 and 12) are to guide a lateral wire 42 onto a grid frame 20 mounted on mandrel 36 for winding a plurality of lateral wire turns about the frame, and to cooperate with the mandrel rotating step motor 52 for threading the lateral wire between the pairs of frame ears 26 and 27. All the wire feed mechanisms are mounted on table 45 for movement therewith.

Table 45 is slidably mounted on the machine framework and is coupled to a driving system (not shown) for providing movement of table 45 laterally with respect to mandrel 36. The driving system moves table 45 to the right as shown in FIG. 3, whereby upon rotation of mandrel 36, a number of spaced lateral wire turns may be wound about a grid frame 20 mounted on the mandrel. Although not shown, an automatically operated latch and spring arrangement is provided for coupling table 45 to a feed screw driven by the driving system to cause the feeding mechanism to move at a rate to provide a desired pitch between the lateral wire turns. At the conclusion of the grid frame winding and wire securing operations, as will be described, the latch is released and table 45 is rapidly and abruptly indexed back to its original position. As shown in FIG. 12, arms 130 and 131 of wire guide 40 each have a vertical rod 136 mounted at an end thereof, the rods cooperating to serve as a pair of jaws through which the lateral wire 42 is guided. Army 130 is rigidly fastened to slide 132, but arm 131 is rotatably mounted on pin 138 fixed to slide 132. The plunger 139 of a solenoid 140 mounted on slide 132 engages arm 131 and movement of plunger 139 outwardly of solenoid 140 results in a closing of the jaws 136. Compression spring 141 is provided between arms 130 and 131 which operates to open the jaws 136 upon retraction of plunger 139. The lateral wire 42 passes directly from pool 43 through the jaws 136 and thence to a grid frame 20 on mandrel 36 during the grid winding operations. The purpose of tension motor 135 (FIG. 3) is to provide a predetermined amount of tension to the lateral wire as it is being wound about the grid frame.

As mentioned, the wire guide 40 is movable laterally with respect to mandrel 36 in a series of discrete steps for threading the lateral wire 42 between the grid frame ears 26 and 27. For accomplishing this stepping motion, slide 132 (FIG. 12) is slidably mounted on a pair of guides 143 which are parallel to mandrel 36 and which are supported on blocks 62 and 145 mounted on table 45. A cam 58 mounted on shaft 148 is provided which engages a cam follower roller 149 mounted at the end of slide 132, the mounting link connecting the roller 149 to slide 132 extending through an opening in block 62. Cam 58 has a development designed to provide the prescribed step-like motion of slide 132 and hence wire guide 40. Compression springs 152 are provided on guides 143 between slide 132 and block 145 for maintaining roller 149 in contact with cam 58 whereby slide 132 is indexable either to the left or to the right. Rotation of cam 58 is provided by means of the step motor 53 (FIG. 2) which is also mounted on table 45. This step motor is coupled to cam 58 by means of a timing belt 57 and a pulley 154 mounted on shaft 148. Upon receipt of a series of electrical signals, step motor 53 rotates cam 58 through predetermined angular increments thereby causing the desired indexing of slide 132.

Wire gripper mechanism

The wire gripper mechanism 46 is provided for grasping a portion of the lateral wire 42 extending between spool 43 and the jaws 136 of wire guide 40 and for pulling the wire across and against the grid frame 20 mounted on mandrel 36. A further purpose of this mechanism is to break the length of lateral wire which extends from ears 26 to the gripper mechanism after these ears are crimped over against the frame side rod 21.

As shown in FIGS. 3, 4, 5 and 13, the wire gripper mechanism 46 comprises a frame 160 mounted on base plate 60, a platform 161 (FIGS. 5 and 13) mounted on four pivoted arms 162, and a slide 165 dove-tailed to slide within platform 161. Mounted on slide 165 are a pair of arms 166, each arm having a cylindrical rod 167 at the end thereof which cooperate to serve as a pair of lateral wire grasping jaws. Arms 166 are pivotally mounted on pins 169 secured to slide 165 and are actuated by means of a solenoid 170 also mounted on slide 165. Jaws 167 are biased to remain normally open by means of a spring 171 extending between the ends 172 of arms 166, but movement of plunger 174 (FIG. 3) outwardly of solenoid 170 forces the ends 172 of arms 166 apart thereby closing the jaws 168.

As shown in FIGS. 3 and 4, a rotary solenoid 177 is rigidly secured to a bracket 178 extending from frame 160, the solenoid including two rotatable arms 179 secured to the armature 180 thereof. A shaft 181 is mounted between the ends 182 of arms 179 and has slidably mounted thereon a spider 183 which is journalled for vertical movement within a yoke 185 secured to slide 165 by means of bolts 186. Upon receipt of an electrical signal by solenoid 177, arms 179 are rotated once very rapidly clockwise and then counterclockwise (as of FIG. 4) through a predetermined angular increment. Yoke 185 is rigidly secured to slide 165 and the effect of the arcuate movement of shaft 181 is to crank slide 165 and arms 166 forwardly and then backwardly (as indicated in phantom in FIG. 3) very abruptly for reasons to be described.

Platform 161 (FIGS. 3, 5 and 13) is supported on the ends of the four rotatable arms 162 by means of pins 187, the opposite ends of the arms being secured to shafts 190 rotatably mounted within frame 160. Each shaft 190 has a gear 193 mounted thereon, the gears 193 being meshed with a central gear 194 coupled to the armature shaft 195 of a rotary solenoid 196 secured to frame 160. Upon actuation of solenoid 196, the armature shaft 195 is rotated relatively slowly first clockwise (as of FIG. 5) and then counterclockwise through a predetermined angular increment. Rotation of armature 195 results in a rotation of central gear 194, gears 193, shafts 190 and arms 162. Rotation of arms 162, in turn, results in a movement of platform 161 and slide 165 thereon through an arcuate path, first counterclockwise and then clockwise.

As shown in phantom in FIGS. 3 and 5, the path of arms 166 and jaws 167 upon movement of platform 161 is perpendicular to the longitudinal axis of mandrel 36 and is co-linear with the tensioned lateral wire 42 extending between the supply spool 43 and the jaws 136 of the wire guide 40. Jaws 167 are conveyed over the mandrel to a position between jaws 136 and spool 43. Jaws 167 are open at this time and are thus positioned astride the extended lateral wire for grasping the lateral wire and for pulling it across mandrel 36 and against frame 20. Jaws 167 are closed about the lateral wire 42, jaws 136 are opened, and platform 161 is returned to its rest position (FIGS. 3, 5 and 12). As shown in FIG. 5, platform 161 is arranged so that in its rest position, rods 167 extend somewhat below both mandrel 36 and wire guide 40. Because of this, the lateral wire 42 is held by jaws 167 in firm contact with the grid frame 20 to permit threading of the wire between ears 26, as will be described hereinafter. Although the lateral wire 42 is removed from the wire guide 40 jaws 136 by jaws 167 as the latter starts on its return path, the lateral wire is rethreaded through jaws 136 as jaws 167 approach their rest position.

Anvil mechanism

As mentioned, one purpose of mandrel 36 is to convey a grid frame 20 mounted on the mandrel to a position adjacent the lateral wire guide 40 of the wire feed mechanisms. The frame is slidably mounted on the mandrel, and to insure exact positioning of the grid frame with respect to the wire guide, a frame positioning anvil mechanism 48 is provided.

As shown in FIGS. 4 and 5 anvil mechanism 48 includes a mandrel supporting anvil 110 slidably mounted within a housing 112 secured to base plate 60. Housing 112 is located so as to position anvil 110 directly beneath the path of mandrel 36, and a cam 113 is provided for raising and lowering anvil 110 within housing 112. Cam 113 is followed by a roller 114 secured to anvil 110, a spring 115 being provided to maintain the roller in contact with the cam, and a step motor 116 (FIG. 3) being provided to drive cam 113 through shaft 117.

Anvil 110 is provided with a pair of shoulders 123 which extend upwardly therefrom a predetermined distance, the height of the shoulders being the same. Positioned between the shoulders 123 and mounted astride portion 119 of anvil 110 is a stop 120. Stop 120 is slidably mounted on the anvil, and a spring 121 is provided which biases a lip 122 of the stop to extend above the anvil a distance greater than that of shoulders 123. Because of the spring loading of stop 120 on anvil 110, it is possible to reduce the extending height of the stop for reasons to be described.

The manner in which anvil 110 positions frame 20 with respect to the wire grid 40 is as follows: after mandrel 36 removes a frame 20 from tray 34 and conveys it forward, as described, the leading end 104 of the mandrel passes directly over anvil 110. At this time, the height of anvil 110 within housing 112 as determined by cam 113 is such that the top end of lip 122 just barely grazes the underside of the mandrel. The leading end 104 of the mandrel passes unimpeded over lip 122, but when the grid frame 20 reaches the stop, one of the cross straps 25 abuts against lip 122 thereby preventing further advance of the frame. Since the anvil and stop thereon are located in predetermined position with respect to wire guide 40, the frame 20 is thus also properly positioned with respect thereto. Although the frame 20 is prevented from further advance by stop 120, the mandrel 36 continues its advance by sliding through the fixed frame, the leading end 104 then entering the lathe head 107.

A further purpose of anvil 110 is to provide support to mandrel 36 for preventing deformation of the mandrel during ear crimping. To this end, the shoulders 123 of anvil 110 are provided which are adapted to engage the mandrel adjacent opposite ends of the grid frame thereon. Prior to ear crimping, anvil 110 is raised by cam 113 so that stop 120 engages the underside of the mandrel and is forced downwardly of the anvil portion 119 in order to permit engagement of shoulders 123 with the mandrel.

It is noted that shoulders 123 do not engage the frame 20 during ear crimping, but rather engage mandrel 36 directly. The reason for this is that if the shoulders engaged the frame at the underside of the mandrel in an instance wherein a slightly oversize frame were being wound, the side rod 21 at the upper side of the mandrel would be raised therefrom. The support to the upper side rod would then be only that provided by the cross strap pairs 24 and 25. During ear crimping, the force exerted by tool 49 would thus tend to distort and buckle the fragile grid frame. By providing support solely to the mandrel 36, the upper side rod is pressed against and hence supported by the mandrel during ear crimping while the cross strap pairs are subjected to no distorting forces.

Ear crimping mechanism

A crimping tool mechanism 50 for crimping ears 26 and 27 against a side rod 21 for securing the lateral wire 42 therebetween is shown in FIGS. 2, 4, 5 and 14. For supporting the crimping mechanism, a frame 206 is provided secured to base plate 60, and the crimping mechanism 50 is slidably mounted on guide shafts 207 secured to frame 206. The crimping mechanism 50 includes a housing 210 having a crimping tool 49 slidably mounted therein, and a crimping tool actuating air cylinder 211 secured to housing 210. A bracket 212 is provided connecting housing 210 to table 45 (FIG. 2) whereby the crimping mechanism 50 is movable with table 45 for positioning the crimping tool first over ears 26 of a grid frame mounted on mandrel 36 and then over ears 27.

Vertical movement of crimping tool 49 outwardly of housing 210 is provided by air cylinder 211. Plunger 214 of air cylinder 211 is secured to a block 215 (FIG. 14) slidably mounted within hollow cylinder 216 having a spring 217 therein. The outer wall of cylinder 216 is connected by means of a bracket 218 (FIG. 4) to a plate 219 having a rack 220 suspended therefrom. Plate 219 is slidably mounted within a slide gib 221 and rack 220 is meshed with a gear 222 mounted on one end of a shaft 223. Shaft 223 is rotatably mounted within housing 210, and has mounted on its other end a gear 224, gear 224, in turn, being meshed with a vertical rack 225 secured to crimping tool 49. Movement of plunger 214 outwardly of air cylinder 211 thus operates to move crimping tool 49 downwardly through the impositive coupling provided by spring 217.

Upon downward movement of crimping tool 49, the lower end 226 thereof engages a pair of ears 26 or 27 of the grid frame. The end 226 of the crimping tool is of generally U-shape (FIG. 5) and upon engagement of the tool end 226 with the ears, the ears are crimped inwardly toward one another and against the side rod 21. Prior to crimping, the lateral wire 42 is threaded between the ears and along the side rod, as will be described. Upon crimping of the ears, the lateral wire is firmly clamped and secured between the ears and the side rod. Spring 217 provides means for cushioning the impact of crimping tool 49 against the grid frame 20.

Mandrel driving means

Referring to FIGS. 2 and 3, the leading end 104 of the mandrel is inserted into a rectangular aperture 106 within lathe head 107 (FIG. 3) for providing rotation of mandrel 36. Lathe head 107 is mounted on and driven by a shaft 230, shaft 230 being coupled within a gear box 54 to two driving shafts 231 and 232. Rotation of either shaft 231 or 232 results in rotation of shaft 230 and hence rotation of lathe head 107 and mandrel 36.

Shaft 231 is coupled ot the armature of an indexing motor 52 mounted on base plate 60, and shaft 232 is coupled to a driving system (not shown). As mentioned hereinbefore, the driving system is also coupled to table 45 of the wire feed mechanisms for providing the necessary continuous feed of table 45 with respect to mandrel 36. Electrical mechanical clutch means are also provided (not shown) for simultaneously coupling or decoupling the driving system from shaft 232 and table 45, and for coupling or decoupling the armature of step motor 52 from shaft 231. By this arrangement, either the driving system or the step motor 52 may be used to rotate mandrel 36.

Since the driving system simultaneously rotates mandrel 36 while moving the wire feed mechanism laterally thereto, synchronization between the rotation of the mandrel and the feed of the wire guide 40 is provided whereby the desired pitch of the lateral wire turns about the grid frame 20 may be obtained. Rotation of mandrel 36 by step motor 52, conversely, is independent of the feed of table 45 thereby permitting threading of the lateral wire 42 between ears 26 and 27, as will be described.

The clutch mechanisms as well as the driving system, as mentioned, are known in the art, and for the sake of brevity and clarity, further description thereof will be omitted.

Indexing motor 52 may comprise a commercially available motor of the type which has the feature that upon receipt of a first electrical signal, the motor armature will index from any angular setting it happens to be in to a first predetermined orientation. Upon receipt of further signals, the armature will rotate from the first predetermined orientation through discrete angular increments. In the apparatus shown, the indexing motor 52 is adjusted to rotate mandrel 36 to an angle 45 degrees from the horizontal upon receipt of a first electrical signal, to a vertical position upon receipt of a second signal, and to a horizontal position upon receipt of a third signal as shown in FIGS. 15, 18 and 16, respectively. Further signals repeat the cycle.

*Timing*

The air cylinders 73 and 99 referred to hereinbefore are controlled by commercially available electrically regulated air valves. Moreover, the solenoids 170, 177 and 196, motors 52, 53 and 116, the magnetic brake 102, the automatic spring and latch mechanism for table 45, and the electro-mechanical clutches are likewise electrically actuated. Proper timing of all these devices may be conveniently provided by use of simple cam microswitch clock motor arrangements not shown.

*Operation*

The operation of this apparatus in performing the sequence of operations for the fabrication of a grid electrode will now be described.

At the start of the sequence of operations, mandrel carriage 95 is in retracted position to the left as in FIG. 2, and slide 32 is located to position tray 34 directly beneath the open end of magazine 30. A grid frame 20 drops into tray 34 and air cylinder 73 is actuated to move slide 32 forward to position tray 34 in the path of mandrel 36.

Mandrel 36 is in locked horizontal orientation by brake 102 at this time, and upon forward movement of carriage 95, the leading end 104 of mandrel 36 passes through the open ends of tray 34 and through the grid frame 20 therein. Slide 32 is retracted, leaving the grid frame mounted on mandrel 36, as described.

Mandrel 36 then conveys the grid frame towards the wire guide 40 of the wire feed mechanisms, the leading end 104 of the mandrel passing directly over anvil 110 and the grid frame being positioned in proper relation to the wire guide 40 as described. The grid frame is positioned so that cross strap pair 24 is slightly to the right of the left hand rod 136 of wire guide 40, as shown in FIG. 12, the legs 22 of the frame extending to the left of the jaws.

Prior to this, the solenoid 140 of the wire guide 40 has been energized thereby closing jaws 136 about the end of the lateral wire 42 extending between the spool 43 and the wire guide 40. Solenoid 196 of the wire gripper mechanism 46 is then actuated, and arms 166 are conveyed through the arcuate path shown in FIG. 5 to a position such that jaws 167 are positioned astride the lateral wire 42 as shown in phantom in FIG. 3. Solenoid 170 is energized to cause jaws 167 to grasp the lateral wire, solenoid 140 is de-energized to open jaws 136, and upon return of platform 161 to its rest position shown in FIG. 5, lateral wire 42 is pulled across the mandrel 36. Mandrel 36 is still in horizontal orientation, and the lateral wire 42 is placed in contact with the frame 20 thereon so that the wire extends parallel to and just to the left of cross straps 24 of the grid frame as shown in FIG. 12, and in front of straps 24 as shown in FIG. 16.

Cam 113 of the anvil mechanism 48 is then rotated by step motor 116 to lower the anvil 110 and stop 120 thereon, brake 102 on carriage 95 is released, and a first electrical signal is applied to step motor 52 to rotate mandrel 36 to a position 45 degrees with respect to the horizontal (FIG. 15). Step motor 53 on table 45 is then energized and rotation of cam 58 causes slide 132 to index to the right as viewed in FIG. 3. As shown in FIG. 17, the motion of wire guide 40 thereon threads the lateral wire 42 between ears 26 and along the side rod 21. A second electrical signal is applied to step motor 52 and the mandrel is rotated to a vertical position as in FIG. 18.

The movement of slide 132 as caused by rotation of cam 58 conveys wire guide 40 and jaws 136 well beyond ears 26 as shown in FIG. 17 to insure complete threading of the lateral wire 42 therebetween. After threading, however, step motor 53 is further rotated to return slide 132 and wire guide 40 along a portion of their advance to position wire guide 40 and jaws 136 thereon just slightly to the right of cross strap pair 24. In this manner, the first lateral wire turns can be wound closely to the grid frame cross straps 24 for providing the maximum possible wound length of the grid. This is desirable for providing maximum control of the electron current within the electron tube.

Anvil 110 is then raised by cam 113 within housing 112 so as to engage shoulders 123 with the lower side of mandrel 36 (FIG. 4), stop 120 engaging the mandrel and being forced downwardly of anvil portion 119, as described. Crimping tool 49 is then actuated downwardly to crimp ears 26 against the side rod 21 with the lateral wire 42 sandwiched therebetween. Shoulders 123 provide support to the mandrel to prevent deformation thereof. The ears 26 are bent and stretched beyond their elastic limit, thus securely and permanently clamping the end of lateral wire 42 between the ears and the side rod 21 of the grid frame as shown in FIG. 19. Solenoid 177 of the wire gripper mechanism 46 is energized and the sudden movement of slide 165 and arms 166 (FIG. 3) to the right breaks off the extending length of lateral wire 42 against the edge of ears 26.

Having thus affixed the end of the lateral wire 42 to the grid frame 20, the step motor 52 is decoupled from shaft 231, and the driving system is coupled through the clutch means mentioned for rotating mandrel 36 and for advancing the wire feed mechanisms (and the crimping tool mechanism 59 coupled thereto) along the length of the grid frame. Mandrel 36 is rotated through a number of turns sufficient to wind the lateral wire 42 about the side rods 21 over the expanse of the frame 20 between the cross strap pairs 24 and 25.

At the end of the winding operation, the driving system is disengaged and mandrel 36 comes quickly to a halt due to the friction of the parts of the gear box 54. A first electrical signal is applied to the step motor 52, mandrel 36 is rotated to a position 45 degrees to the horizontal, wire 42 is threaded between ears 27, mandrel 36 is rotated to a vertical position, and the ears 27 are subsequently wrapped around the side member 21 by the crimping tool 49 to secure the end of the lateral wire to the grid frame. Anvil 110 is lowered (the anvil having been in its raised position for supporting mandrel 36 during crimping of ears 27) and mandrel 36 is then rotated to a horizontal position by step motor 52. The table 45 automatic latch mechanism is released, and the table 45 is indexed back to its original position as at the start of the grid fabrication sequence. Just prior to this, jaws 136 of the wire guide 40 have been closed by solenoid 140 to clamp the lateral wire therein, and the sudden movement of table 45 and wire guide 40 thereon breaks the lateral wire off against the edges of ears 27.

Brake 102 of the mandrel carriage 95 is then energized to lock mandrel 36 in horizontal orientation, and the mandrel is withdrawn from the lathe head 107 and retracted to the left as viewed in FIG. 2. The wound grid frame is stripped off the mandrel, the slide actuating step motor 53 is rotated to re-position slide 132 to its original position, and the apparatus is ready to fabricate a new grid.

No further grid electrode fabricating steps are required since the tension with which the lateral wire turns are wound serve to maintain the grid turns in place along the grid frame, while the locking of the lateral wire ends to the frame, as described, is a positive and permanent means for maintaining the wire under tension thereinafter. Moreover, the extra grid fabricating steps of removing end turns or lateral wire "tails" as is necessary in many prior art grid fabricating methods is also avoided. Such "tails" often cause electrical short circuiting between tube electrodes and destruction of the electron tube, as known. However, this extra operation is not required with this apparatus, the extending "tails" being broken off very closely to the grid frame ears, as described.

A still further feature of the apparatus of this invention is the ease with which it may be modified to adapt it for fabricating a plurality of grid electrodes simultaneously. For accomplishing this, an extra long winding mandrel is employed and also a number of operating stations spaced along the mandrel path. Each station comprises the wire feed mechanisms, the anvil mechanism 48, the wire gripper mechanism 46, and the crimping mechanism 50, and each station operates on one frame 20. The reason such an arrangement is possible is due to the support provided to the mandrel by the anvil mechanism at each station. Prior art notching and peening apparatus, for example, does not include such mandrel support and only one grid may be fabricated at a time with the prior art apparatus.

What is claimed is:

1. Apparatus for securing and winding a lateral wire about a grid frame, said frame being provided with an extending ear adapted for clamping said lateral wire between said ear and a portion of said frame, said apparatus comprising a frame supporting member, means for mounting a frame on said frame supporting member, means for feeding a lateral wire towards a frame mounted on said frame supporting member, means for grasping said lateral wire adjacent said wire feeding means and for moving said wire for positioning it between said ear and said portion of said frame, and means for crimping said ear against said portion for clamping said lateral wire therebetween.

2. Apparatus for securing and winding a lateral wire about a grid frame, said frame being provided with an extending ear adapted for clamping said lateral wire between said ear and a portion of said frame, said apparatus comprising a rotatable frame supporting member, means for mounting a frame on said frame supporting member, means for feeding a lateral wire towards a frame mounted on said frame supporting member, means for grasping said lateral wire adjacent said wire feeding means for pulling said wire across said mounted frame and positioning said lateral wire between said ear and said portion of said frame, means for crimping said ear against said portion for clamping said lateral wire therebetween, and means for rotating said frame supporting member and frame for winding a plurality of lateral wire turns about said frame.

3. Apparatus for securing and winding a lateral wire about a grid frame, said frame being provided with an extending ear adapted for clamping said lateral wire between said ear and a portion of said frame, said apparatus comprising a rotatable frame supporting member, means for mounting a frame on said frame supporting member, a lateral wire source, means for guiding a lateral wire from said source towards a frame mounted on said frame supporting member, means for grasping said lateral wire between said source and said guiding means for pulling said wire across said mounted frame and positioning said lateral wire between said ear and said portion of said frame, means for crimping said ear against said portion for clamping said lateral wire therebetween, means for rotating said frame supporting member, and means for feeding said lateral wire to said frame for winding a plurality of lateral wire turns about said frame when said frame and supporting member are rotated.

4. Apparatus for securing and winding a lateral wire about a grid frame, said frame being provided with an extending ear adapted for clamping said lateral wire between said ear and a portion of said frame, said apparatus comprising means for mounting said frame on a frame supporting member, means for grasping said lateral wire and pulling it in one direction for placing it into contact with said frame, means for pulling said wire in a second direction for positioning said lateral wire between said ear and said portion of said frame, and means for crimping said ear against said portion for clamping said lateral wire therebetween.

5. Apparatus for securing and winding a lateral wire about a grid frame, said frame being provided with an extending ear adapted for clamping said lateral wire between said ear and a portion of said frame, said apparatus comprising a rotatable frame supporting member, means for mounting a frame on said frame supporting member, means for grasping said lateral wire and pulling it in one direction for placing it into contact with said frame, means pulling said wire in a second direction for positioning said lateral wire between said ear and said portion of said frame, means for crimping said ear against said portion for clamping said lateral wire therebetween, means for rotating said frame supporting member and said frame thereon for winding a plurality of lateral wire turns about said frame.

6. Apparatus for securing and winding a lateral wire about a grid frame, said frame being provided with an extending ear adapted for clamping said lateral wire between said ear and a portion of said frame, said apparatus comprising a grid winding mandrel, means for mounting said frame on said mandrel, wire feeding means, means for grasping a lateral wire fed from said feeding means and for pulling said lateral wire across said frame and for positioning said lateral wire between said ear and said portion of said frame, means for crimping said ear against said portion for clamping said lateral wire to said frame, means for moving said grasping means with respect to said frame for breaking the lateral wire portion extending between said frame and said grasping means, and means for rotating said mandrel and said frame thereon for winding a plurality of lateral wire turns about said frame.

7. Apparatus for securing and winding a lateral wire about a grid frame, said frame being provided with an extending ear adapted for clamping said lateral wire between said ear and a portion of said frame, said apparatus comprising a grid winding mandrel, means for mounting said frame on said mandrel, a wire guide, a lateral wire supply spool, means for grasping a lateral wire extending between said supply spool and said wire guide and for pulling said lateral wire in a first direction across said frame, means for positioning said lateral wire between said ear and said portion of said frame, means for crimping said ear against said portion for clamping said lateral wire to said frame, means for moving said grasping means in a second direction with respect to said frame for breaking the lateral wire portion extending between said frame and said grasping means, means for rotating said mandrel and said frame thereon, and means for moving said wire guide laterally of said mandrel for winding a plurality of lateral wire turns about said frame.

8. Apparatus for securing and winding a lateral wire about a grid frame, said frame including a pair of opposing ears adapted for clamping said lateral wire between said ears and a portion of said frame, said apparatus comprising means for positioning said frame in the path of a grid winding mandrel, means for moving said mandrel through a portion of said positioning means for engaging said frame with said mandrel, a wire guide, a lateral wire supply spool, means for positioning said frame along said mandrel with respect to a predetermined position along said mandrel with respect to said wire guide, means for grasping a lateral wire extending between said supply spool and said wire guide and for pulling said lateral wire in a first direction across said frame, means for positioning said lateral wire between said ears and said grid frame portion, means for supporting said mandrel for preventing deformation thereof, means for crimping said opposing ears towards one another and against said portion for clamping said lateral wire to said frame, means for moving said grasping means in a second direction with respect to said frame for breaking the length of lateral wire extending between said frame and said grasping means, means for rotating said mandrel and said frame thereon, and means for moving said wire guide laterally of said mandrel for winding a plurality of lateral wire turns about said frame.

9. Apparatus for securing and winding a lateral wire about a grid frame having an ear adapted for clamping said lateral wire between said ear and a portion of said frame, said apparatus comprising a grid winding mandrel movable along a first path, and an anvil positioned along said first path, said anvil being movable in a direction intersecting said first path, a wire guide mounted in predetermined position with respect to said anvil, means for indexing said wire guide in discrete steps parallel to said first path, and means for moving said wire guide in a continuous motion parallel to said first path, a lateral wire gripper mounted on a slide movable through an arcuate path, the plane of said arcuate path being perpendicular to said first path, in ear crimping member movable in a direction intersecting said first path, means for rotating said mandrel through discrete angular increments, and means for rotating said mandrel continuously.

10. Apparatus for securing and winding a lateral wire about a grid frame having an ear adapted for clamping said lateral wire between said ear and a portion of said frame, said apparatus comprising a grid winding mandrel movable along a first path, a grid frame receiving and positioning slide movable in a direction intersecting said first path, an anvil positioned along said first path, said anvil being reciprocatingly movable in a direction intersecting said first path, a wire guide mounted in predetermined position with respect to said anvil, means for indexing said wire guide in discrete steps parallel to said first path, and means for moving said wire guide in a continuous motion parallel to said first path, a lateral wire gripper mounted on a slide movable through an arcuate path, the plane of said arcuate path being perpendicular to said first path, an ear crimping member movable in a direction intersecting said first path, means for rotating said mandrel through discrete angular increments, and means for rotating said mandrel continuously.

11. Apparatus for securing and winding a lateral wire about a grid frame having an ear adapted for clamping said lateral wire between said ear and a portion of said frame, said apparatus comprising a grid winding mandrel movable along a first path, a grid frame receiving and positioning slide movable in a direction intersecting said first path, an anvil having a stop thereon positioned along said first path, said anvil and said stop being reciprocatingly movable in a direction intersecting said first path, a wire guide mounted in predetermined position with respect to said stop, means for indexing said wire guide in discrete steps parallel to said first path, and means for moving said wire guide in a continuous motion parallel to said first path, a lateral wire gripper mounted on a slide movable in a direction parallel to said first path, said gripper slide being supported on a platform movable through an arcuate path, the plane of said arcuate path being perpendicular to said first path, an ear crimping member mounted for movement with said wire guide, said crimping member also being movable in a direction intersecting said first path, means for rotating said mandrel through discrete angular increments, and means for rotating said mandrel continuously.

12. Apparatus for securing and winding a lateral wire about a grid frame having a pair of extending ears, said ears being adapted for clamping said lateral wire between said ears and a portion of said frame, said apparatus comprising a grid winding mandrel movable along a first path, a grid frame receiving tray movable along a path intersecting said first path, said tray being adapted for positioning said grid frame in the path of said mandrel, and said mandrel being adapted for supportingly engaging and removing said grid frame from said tray, an anvil reciprocatingly movable in a path intersecting said first path, said anvil having a shoulder portion for supporting said mandrel and a stop portion for positioning a grid frame mounted on said mandrel along said mandrel, a wire guide mounted in predetermined position with respect to said stop portion, a lateral wire supply spool, a lateral wire gripper mounted on a slide movable in a direction parallel to said first path, said gripper slide being mounted on a platform, means for moving said platform in a reciprocatingly arcuate motion towards said wire guide for grasping a lateral wire extending between said spool and said wire guide and for pulling said lateral wire across said grid frame, means for rotating said mandrel through angular steps, and means for indexing said wire guide in a direction parallel to said first path for threading said lateral wire between said ears and along said grid frame portion, an ear crimping member movable along a path intersecting said first path for crimping said ears against said portion, means for rotating said mandrel, and means for moving said wire guide laterally of said mandrel for winding a plurality of lateral wire turns about said grid frame.

13. Apparatus for securing and winding a lateral wire about a grid frame having a pair of extending ears, said ears opposing one another and being adapted for clamping said lateral wire between said ears and a portion of said frame, said apparatus comprising a grid winding mandrel movable along a first path, a grid frame magazine, a grid frame tray movable along a path intersecting said first path, said tray being adapted for receiving said grid frame from said magazine and for positioning it in the path of said mandrel, said mandrel being adapted for supportingly engaging and removing said grid frame from said tray, and said tray having side and bottom portions separable from each other for facilitating removal of said grid frame contained therein, an anvil reciprocatingly movable in a path intersecting said first path, said anvil having a shoulder portion for supporting said mandrel and a stop portion for engaging a grid frame mounted on said mandrel, a wire guide mounted in predetermined position with respect to said stop portion, a lateral wire supply spool, a lateral wire gripper mounted on a slide movable in a direction parallel to said first path, said gripper slide being mounted on a platform, means for moving said platform in a reciprocatingly arcuate motion towards said wire guide for grasping a lateral wire extending between said spool and said wire guide and for pulling said lateral wire across said grid frame, means for rotating said mandrel through angular steps, and means for indexing said wire guide in a direction parallel to said first path for threading said lateral wire between said ears and along said grid frame portion, an ear crimping member mounted in predetermined position with respect to said anvil, said crimping member being movable with said wire guide and being movable along a path intersecting said first path for crimping said ears against said portion, means for rotating said mandrel, and means for moving said wire guide laterally of said mandrel for winding a plurality of lateral wire turns about said grid frame.

14. A grid winding apparatus including a mandrel supporting anvil comprising a body portion having shoulders extending outwardly therefrom and a stop mounted on said body portion and biased to extend outwardly therefrom a distance further than said shoulders, said stop being slidably mounted on said body portion whereby the extending length of said stop may be reduced.

15. A grid winding apparatus including a mandrel supporting anvil mechanism comprising an anvil slidably mounted in a support, means for regulating the height of said anvil within said support, said anvil having raised shoulders adapted for engaging and supporting a mandrel thereon, a stop mounted on said anvil and biased to extend outwardly of said anvil and beyond said shoulders, and said stop being resiliently mounted on said anvil permitting reduction of the extending length of said stop.

16. A grid winding apparatus including a grid winding mandrel and an anvil mechanism, said mandrel being adapted for supporting thereon a grid frame to be wound, and said anvil mechanism comprising an anvil having an outwardly extending shoulder adapted for engaging and supporting said mandrel, said anvil also having a stop mounted thereon adapted for engaging a portion of said grid frame, said stop being biased to extend outwardly from said anvil a distance greater than the extending length of said shoulder, and said stop being retractable for reducing the extending length of said stop for permitting engagement of said shoulder with said mandrel.

17. A grid winding apparatus including a grid winding mandrel movable along a predetermined path, and a mandrel support anvil mechanism positioned along the path of said mandrel, said mandrel being adapted for supporting thereon a grid frame to be wound, and said anvil mechanism comprising an anvil reciprocatingly movable in a direction intersecting the path of said mandrel, said anvil having an outwardly extending shoulder adapted for engaging and supporting said mandrel, and said anvil having a stop mounted thereon adapted for engaging a portion of said grid frame, said stop being biased to extend outwardly from said anvil a distance greater than the extending length of said shoulder, and said stop being retractable for reducing the extending length of said stop for permitting engagement of said shoulder with said mandrel.

18. A grid winding apparatus including an article positioning tray mounted at an end of a slide, said tray comprising a flexible bottom support and a side support, said bottom support being secured to said end of said slide and extending outwardly therefrom, and said side support being secured to the outermost end of said bottom support, the inner surface of said side support tapering in a downward direction towards said slide, whereby upon exertion of a force substantially parallel to said bottom support against said inner surface, said bottom support flexes downwardly displacing said side support out of the path of said line force.

19. A grid winding apparatus including an article positioning tray mounted at the end of a slide, said tray comprising a flexible bottom support, a first side portion, and a second side portion, said bottom support being secured to said end of said slide and extending outwardly therefrom, said first side portion being secured to the end of said bottom support, and said second side portion being integral with said end of said slide, said first and second side portions being substantially parallel to each other, whereby upon exertion of a force parallel to said bottom support against the surface of said first side portion facing said second side portion, said bottom support flexes downwardly displacing said first side portion out of the path of said line force.

20. A grid winding apparatus including an article transferring and positioning device comprising a slide and means for advancing and retracting said slide along an axis, a resilient support secured to the underside of an end of said slide and extending axially therefrom, a first upright wall portion secured to the outer end of said support and extendiing in a direction perpendicular to said axis, a second upright wall portion at said end of said slide and extending parallel to said first upright, said uprights and said support providing a tray for receiving said article, said first upright having an inner surface tapering in a downward direction towards said second upright, whereby upon retraction of said slide and exertion of a line force parallel to said axis against said inner surface of said first upright, said support flexes downwardly displacing said first upright out of the path of said force.

21. A grid winding apparatus including an article transferring and positioning device comprising a slide, said slide being advanceable and retractable along an axis, an article receiving mandrel, means for advancing said mandrel along a path intersecting said axis, and an article receiving tray mounted at an end of said slide, said tray including a resilient support secured to the underside of said slide and extending axially therefrom, a first wall portion secured to the outer end of said support and extending in a direction perpendicular to said axis, a second wall portion at the end of said slide and extending parallel to said first wall portion, said first wall portion having an inner surface tapering in a downward direction towards said second wall portion, said tray having open ends permitting passage of said mandrel through said tray for supportingly engaging said article therein, whereby upon retraction of said slide said support flexes downwardly permitting passage of said first wall portion past said mandrel and said article engaged therewith.

References Cited in the file of this patent

UNITED STATES PATENTS

| | | |
|---|---|---|
| 1,830,222 | Brindle | Nov. 3, 1931 |
| 2,166,841 | Helgason et al. | July 18, 1939 |
| 2,589,503 | McCullough | Mar. 18, 1952 |
| 3,010,490 | Gartner et al. | Nov. 28, 1961 |
| 3,034,663 | Crosby et al. | May 15, 1962 |
| 3,081,000 | Crosby et al. | Mar. 19, 1963 |

FOREIGN PATENTS

| | | |
|---|---|---|
| 963,260 | Germany | May 2, 1957 |
| 601,817 | Canada | July 19, 1960 |